UNITED STATES PATENT OFFICE 2,260,265

MANUFACTURE OF AMINES

Murray Senkus, Terre Haute, Ind., assignor to Commercial Solvents Corporation, Terre Haute, Ind., a corporation of Maryland No Drawing. Application July 18, 1940, Serial No. 346,147

9 Claims. (Cl. 260—338)

My invention relates to new amino compounds and to a process for producing said compounds. More particularly it relates to 5-substituted-amino-1,3-dioxanes and to a method for producing the same by liquid phase catalytic hydrogenation of the corresponding 5-substituted-methenylamino-1,3-dioxanes.

The amino dioxanes of my present invention comprise 5-substituted-amino-1,3-dioxanes having the general structural formula:

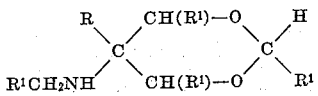

wherein R may represent either hydrogen, alkyl, or alpha-hydroxyalkyl, and $R^1$ may be hydrogen, alkyl, aryl, or furyl. As examples of the 5-substituted-amino-1,3-dioxanes included by the above generic formula, there may be mentioned the 5-methylamino-1,3-dioxanes, the 5-benzylamino-1,3-dioxanes, the 5-(2-ethylhexyl) amino-1,3-dioxanes, and the 5-furfurylamino-1,3-dioxanes. These four classes of compounds may be represented by the following respective structural formulas; however, it is to be understood that such compounds are mentioned merely by way of illustration, and that the scope of my invention is not restricted thereto.

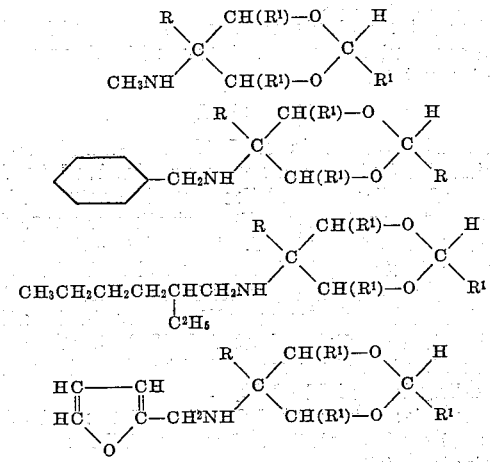

in which R may represent hydrogen, alkyl, or alpha-hydroxyalkyl, and $R^1$ may be either hydrogen, alkyl, aryl, or furyl.

As specific examples of the 5-substituted-amino-1,3-dioxanes, covered by my invention, there may be mentioned 2-phenyl-5-methyl-5-methylamino-1,3-dioxane, 2-furyl-5-methyl-5-furfurylamino-1,3-dioxane, 2-propyl-5-hydroxymethyl-5-butylamino-1,3-dioxane, 2-propyl-5-methyl-5-benzylamino-1,3-dioxane, and the like.

The 5-substituted-amino-1,3-dioxanes of my invention may be prepared in accordance with any convenient procedure. I prefer, however, to prepare such compounds by the liquid phase catalytic hydrogenation of the corresponding 5 - substituted - methyl-amino-1,3-dioxanes. In accordance with this procedure, the hydrogenation reaction is carried out in the presence of a suitable catalyst, in the liquid phase, with or without an auxiliary solvent, at a temperature not substantially in excess of 150° C. The solvent employed may be any which is inert toward the catalyst and reactants under the described conditions, as, for example, aqueous or anhydrous methyl or ethyl alcohol.

In general, any hydrogenation catalyst may be utilized which exhibits catalytic activity under the conditions employed. Examples of such catalysts are nickel chromite, copper chromite, cobalt-on-kieselguhr, copper silica gel, and the like. I prefer, however, to use a finely-divided nickel catalyst which may be conveniently prepared, in the powdered form, by treating a nickel aluminum alloy containing approximately 50% aluminum and 50% nickel, with strong alkali solution, and leaching the resulting nickel residue with water, after which said catalyst is kept from contact with the atmosphere by storage under a suitable liquid. The catalyst produced in accordance with the above-described procedure has been found to be active at temperatures as low as approximately 25° C., and may be re-used in numerous subsequent runs before becoming inactivated.

The hydrogenation reaction, in general, may be effected at hydrogen pressures ranging from atmospheric pressure to pressures slightly in excess of 2000 pounds per square inch. However, I prefer to carry out such reactions at a pressure of approximately 2000 pounds per square inch, and at temperatures of 50° C. to 85° C. It is to be noted that such temperature and pressure relationship varies with the particular compound being hydrogenated. I have found, however, that the upper limit of said temperature and pressure lies slightly below that combination of temperature and pressure which is sufficient to bring about hydrogenolysis of the 5-substituted-methenyl-amino-1,3-dioxane in question. The rate of reaction is directly proportional to the temperatures and pressures utilized, and therefore if lower pressures are desired, correspondingly higher temperatures should be employed. The lower temperatures and pressures will generally require a longer period for completion of the reaction, and, conversely, higher temperatures and pressure will, in general, shorten the reaction time. However, under the latter conditions excessive pressures and/or temperatures, even with a short reaction period, tend to result in decreased yields of the desired amine. When carrying out the reaction in accordance with the preferred conditions described above, the hydrogenation is ordinarily found to be complete after a period of from one to two hours. Optimum conditions in connection with temperature, pressure, and catalyst, in any given instance, however, may be readily determined by experiment.

Upon completion of the reaction, as may be determined by the failure of additional hydrogen absorption, the catalyst is preferably separated from the reaction mixture by filtration, and the solvent, if employed, is distilled off. The 5-substituted-amino-1,3-dioxanes obtained in this manner are, in general, relatively pure compounds. However, if it is desired to purify these materials further, the compounds which are solids at ordinary temperatures may be readily recrystallized from any of the common organic solvents, such as methanol, benzene, ether, or petroleum ether. The products which are liquids at ordinary temperatures may be further purified by distillation under reduced pressure. Likewise, removal of impurities in either the solid or liquid products may be readily effected by heating the same with a small quantity of decolorizing charcoal or similar material.

The 5-substituted-imino-1,3-dioxanes employed in the preparation of the compounds of my invention may be prepared in accordance with any known method. I prefer, however, to prepare these compounds by means of the procedure described in my co-pending application, Ser. No. 346,146, filed July 18, 1940. According to this process, a mixture of the 5-amino-1,3-dioxane, and the aldehyde required to give the desired 5-substituted-methenylamino-1,3-dioxane is heated, and the water formed during the reaction is removed from the reaction mixture by distillation. After the formation of water ceases, the residue, which comprises principally crude 5-substituted-methenylamino-1,3-dioxane, may be purified by distillation under reduced pressure, or crystallization from a suitable solvent, such as methanol, benzene, or petroleum ether, depending upon the physical properties of the particular compound.

The 5-amino-1,3-dioxanes, referred to above, preferably are prepared in the manner set forth in my co-pending application, U. S. Ser. No. 331,770, filed April 26, 1940. In accordance with this procedure, the corresponding 5-nitro-1,3-dioxanes are hydrogenated in the liquid phase in the presence of a finely-divided nickel catalyst, at a temperature of approximately 25° C., and under a hydrogen pressure of about 2000 pounds per square inch.

The 5-nitro-1,3-dioxanes mentioned above are likewise most desirably prepared in the manner described in my co-pending application, U. S. Ser. No. 331,769, filed April 26, 1940. According to this process, said 5-nitro-1,3-dioxanes are produced by reacting a suitable nitro glycol with an approximately equimolecular quantity of the desired aldehyde, in the presence of a small amount of a mineral acid catalyst.

The following examples disclose certain of the new 5-substituted-amino-1,3-dioxanes, and processes for their preparation. However, it is to be understood that such examples are merely illustrative, and do not in any way limit the scope of my invention, since I have found that the general class of compounds, herein described, may be prepared in accordance with the procedure outlined above.

*Example I*

Fifty-five parts of 5-ethyl-5-methenylamino-1,3-dioxane, 275 parts of methyl alcohol, and 3 parts of nickel catalyst, prepared as described above, were placed in a suitable hydrogenation apparatus, and sealed. This solution was then subjected to a hydrogen pressure of 2000 pounds per square inch, at a temperature of 75° C., for a period of one hour, with constant agitation. After absorption of hydrogen had ceased, the reaction mixture was withdrawn from the hydrogenation apparatus, the catalyst removed from the solution by filtration, and the methyl alcohol separated from the said reaction mixture by means of fractional distillation. The 5-ethyl-5-methylamino-1,3-dioxane, produced in this manner, was distilled at 53° C. (1 mm.). The quantity of product, boiling at this fraction, amounted to 50 parts, corresponding to a yield of 87%.

Analysis: Calculated for $C_7H_5NO_2$: N, 9.50; neutral equivalent, 146. Found: N, 9.81; neutral equivalent, 148.

*Example II*

2-propyl-5-benzylamino-5-methyl-1,3-dioxane was prepared by dissolving 40 parts of 2-propyl-5-benzylidene-amino-5-methyl-1,3-dioxane in 150 parts of methanol. This solution was then hydrogenated in the presence of 5 parts of nickel catalyst, at a temperature of 60° C., and a hydrogen pressure of 2000 pounds per square inch. The crude 2-propyl-5-benzylamino-5-methyl-1,3-dioxane thus obtained was separated from the reaction mixture, in accordance with the procedure described in Example I. Said crude 2-propyl-5-benzylamino-5-methyl-1,3-dioxane was then distilled under vacuum, and the portion boiling at 125–127° C. (1 mm.) was collected. This fraction amounted to 36 parts, corresponding to a yield of 90%.

Analysis: Calculated for $C_{15}H_{23}NO_2$: N, 5.59; neutral equivalent, 249. Found: N, 5.69; neutral equivalent, 249.

*Example III*

Twenty-five parts of 5-(2-ethyl-hexylidene)-amino-5-ethyl-1,3-dioxane was dissolved in 150 parts of methanol and the resulting solution hydrogenated under conditions similar to those described in Example I. The 5-(2-ethylhexylamino)-5-ethyl-1,3-dioxane produced in this manner was then separated from the reaction mixture in accordance with Example I, after which it was distilled at 120–121° C. (3 mm.). The refined product amounted to 19 parts, corresponding to a yield of 80%.

Analysis: Calculated for $C_{14}H_{29}NO_2$: N, 5.76; neutral equivalent, 243. Found: N, 5.49; neutral equivalent, 243.

The 5-substituted-amino-1,3-dioxanes of the present invention are either water-white liquids or white crystalline solids, and have been found to be soluble in methanol, ether, and benzene, but insoluble in water. These products have been found to be useful as intermediates in the preparation of numerous organic compounds.

Other uses of these materials will readily occur to those skilled in the art.

My invention having now been described, what I claim is:

1. 5-Substituted-amino-1,3-dioxanes having the structural formula:

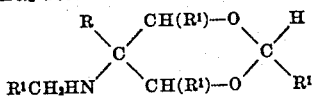

wherein R is a member of the group consisting of hydrogen, alkyl, and alpha-hydroxyalkyl and $R^1$ represents a member of the group consisting of hydrogen, alkyl, aryl, and furyl.

2. 5-Substituted-amino-1,3-dioxanes having the structural formula:

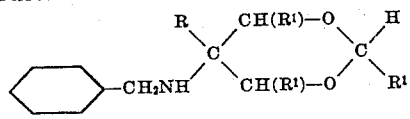

wherein R is a member of the group consisting of hydrogen, alkyl, and apha-hydroxyalkyl and $R^1$ represent a member of the group consisting of hydrogen, alkyl, aryl, and furyl.

3. 5-Substituted-amino-1,3-dioxanes having the structural formula:

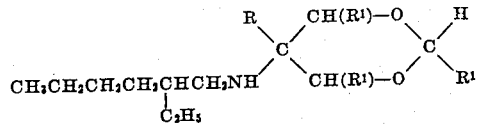

wherein R is a member of the group consisting of hydrogen, alkyl, and alpha-hydroxyalkyl and $R^1$ represents a member of the group consisting of hydrogen, alkyl, aryl, and furyl.

4. 5-Substituted-amino-1,3-dioxanes having the structural formula:

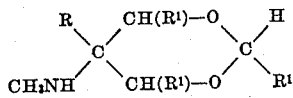

wherein R is a member of the group consisting of hydrogen, alkyl, and alpha-hydroxyalkyl, and $R^1$ represents a member of the group consisting of hydrogen, alkyl, aryl, and furyl.

5. 5-Ethyl-5-methylamino-1,3-dioxane.

6. 2-Propyl-5-benzylamino-5-methyl-1,3-dioxane.

7. 5-(2-Ethylhexyl)amino-5-ethyl-1,3-dioxane.

8. In a process for the hydrogenation of 5-substituted-imino-1,3-dioxanes to the corresponding 5-substituted-amino-1,3-dioxanes, the step which comprises subjecting a 5-substituted-methenyl-amino-1,3-dioxane to hydrogenation in the liquid phase in the presence of a hydrogenation catalyst, at a temperature not substantially in excess of 150° C.

9. In a process for the hydrogenation of 5-substituted-imino-1,3-dioxanes to the corresponding 5-substituted-amino-1,3-dioxanes, the step which comprises subjecting a 5-substituted-methenyl-amino-1,3-dioxane to hydrogenation in the liquid phase in the presence of a hydrogenation catalyst, at a temperature of 50°–85° C.

MURRAY SENKUS.

CERTIFICATE OF CORRECTION.

Patent No. 2,260,265. October 21, 1941.

MURRAY SENKUS.

It is hereby certified that error appears in the printed specification of the above numbered patent requiring correction as follows: Page 1, second column, line 9, for "methyl" read --methenyl--; page 3, first column, line 10, claim 1, for that portion of the formula reading "$R^1CH_2HN$" read --$R^1CH_2NH$--; and that the said Letters Patent should be read with this correction therein that the same may conform to the record of the case in the Patent Office.

Signed and sealed this 14th day of July, A. D. 1942.

(Seal)

Henry Van Arsdale,
Acting Commissioner of Patents.